(12) United States Patent
Makolin et al.

(10) Patent No.: US 6,737,141 B2
(45) Date of Patent: May 18, 2004

(54) USABLE SPLICE FOR A STABILIZED ABSORBENT AND METHOD FOR MAKING THE SPLICE

(75) Inventors: Robert J. Makolin, Neenah, WI (US); David J. Nickel, Menasha, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 37 days.

(21) Appl. No.: 10/192,136

(22) Filed: Jul. 9, 2002

(65) Prior Publication Data

US 2003/0181881 A1 Sep. 25, 2003

Related U.S. Application Data

(60) Provisional application No. 60/366,285, filed on Mar. 20, 2002.

(51) Int. Cl.[7] .................................. B32B 3/16
(52) U.S. Cl. ........................................ 428/57
(58) Field of Search ...................... 428/57, 58

(56) References Cited

U.S. PATENT DOCUMENTS

| | | |
|---|---|---|
| 2,495,761 A | 1/1950 | Platt |
| 2,737,466 A | 3/1956 | Utermohlen, Jr. et al. |
| 3,633,352 A | 1/1972 | Marriner |
| 3,886,031 A | 5/1975 | Taitel |
| 4,154,883 A | 5/1979 | Elias |
| 4,190,483 A | 2/1980 | Ryan et al. |
| 4,374,576 A | 2/1983 | Ryan |
| 4,776,920 A | 10/1988 | Ryan |
| 4,798,603 A | 1/1989 | Meyer et al. |
| 4,923,546 A | 5/1990 | Wheeler et al. |
| 5,176,668 A | 1/1993 | Bernardin |
| 5,176,672 A | 1/1993 | Bruemmer et al. |
| 5,192,606 A | 3/1993 | Proxmire et al. |
| 5,509,915 A | 4/1996 | Hanson et al. |
| 5,514,237 A | 5/1996 | Emenaker et al. |
| 5,584,897 A | 12/1996 | Christianson et al. |
| 5,750,217 A | 5/1998 | Kearby et al. |
| 6,001,442 A | 12/1999 | Rockwell, Jr. |
| 6,160,197 A | 12/2000 | Lassen et al. |
| 2001/0003615 A1 | 6/2001 | Lester |
| 2003/0125686 A1 | 7/2003 | Beitz et al. |

FOREIGN PATENT DOCUMENTS

| | | |
|---|---|---|
| DE | 196 02 575 A1 | 7/1997 |
| EP | 0 842 756 A1 | 5/1998 |
| EP | 0 844 062 A1 | 5/1998 |
| EP | 1 184 344 A1 | 6/2002 |
| WO | WO 99/59907 A1 | 11/1999 |
| WO | WO 00/77286 A1 | 12/2000 |
| WO | WO 02/102665 A1 | 12/2002 |

*Primary Examiner*—Alexander S. Thomas
(74) *Attorney, Agent, or Firm*—Paul Y. Yee

(57) ABSTRACT

A process for splicing a first section of absorbent material to a second section of absorbent material to form a longer, continuous length (20) of absorbent material suitable for a substantially uninterrupted sequential in-feed to a processing machine. The process includes a placing of a trailing end (26) of a first portion (22) of absorbent material in a position that substantially overlaps a leading end (28) of a second portion (24) of absorbent material to provide an overlapped splicing region (42). The trailing end (26) of the first portion (22) is attached to the leading end (28) of the second portion (24) along at least a part of the overlapped splicing region (42) with a thermal bond that provides a splice between the first portion (22) of absorbent material and the second portion (24) of absorbent material, and in a particular aspect, the absorbent material can be configured to provide an airlaid, nonwoven absorbent material. In another aspect, the trailing end (26) of the first portion (22) can be aligned with the leading end (28) of the second portion (24). In a further aspect, the splice has an operative tensile strength which is sufficient to support the sequential in-feed.

5 Claims, 7 Drawing Sheets

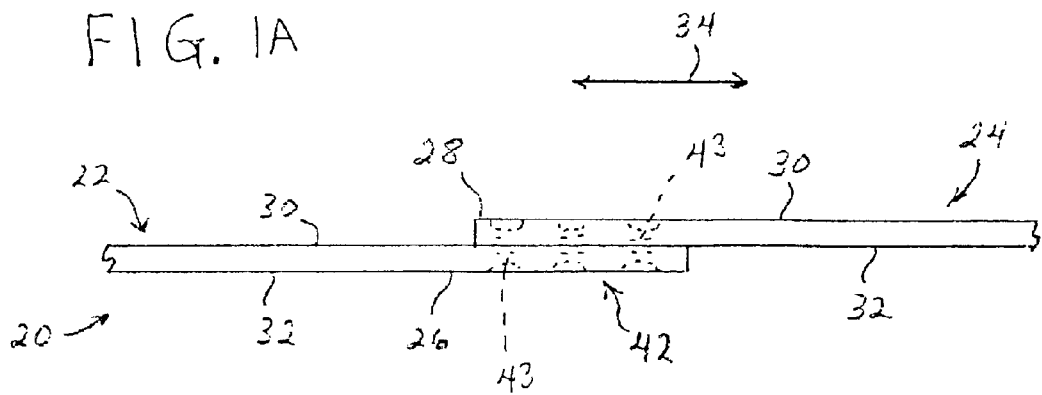
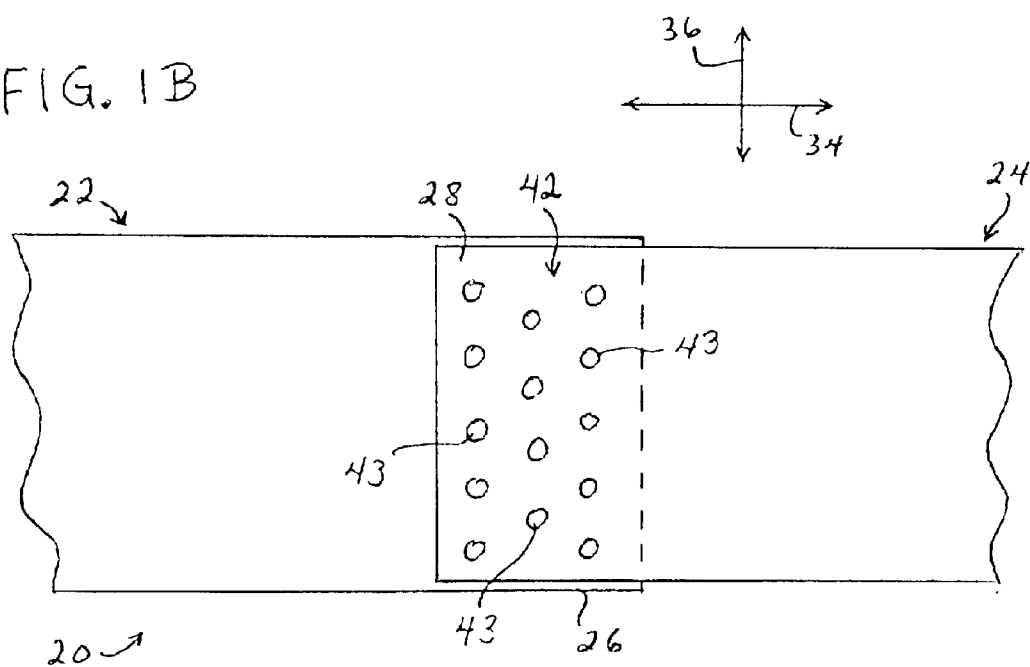

USABLE SPLICE FOR A STABILIZED ABSORBENT AND METHOD FOR MAKING THE SPLICE

CROSS-REFERENCE TO RELATED APPLICATIONS

This application claims the benefit of now abandoned U.S. Provisional Patent Application Serial No. 60/366,285 entitled USABLE SPLICE FOR A STABILIZED ABSORBENT AND METHOD FOR MAKING THE SPLICE by R. J. Makolin et al. and filed Mar. 20, 2002, the entire disclosure of which is incorporated herein by reference.

BACKGROUND OF THE INVENTION

This invention generally relates to the manufacture of absorbent articles from absorbent material, and in particular to a splice connecting two portions of absorbent material which is useable in articles.

Personal care absorbent articles such as disposable diapers, training pants, other infant care products, other child care products, feminine napkins, panty liners, interlabial pads, other feminine care products, incontinence articles, and other adult care products have typically been manufactured using high-speed processing machines which have converted a stabilized web or ribbon of a fibrous absorbent material into an article. Each web has been pre-formed and provided to the machine as a wound roll or coil, in stacks of material, or blocks of connected or unconnected stacks of material. To prevent interruption of the processing machine a trailing end of each coil has been spliced to a leading end of the next coil. The resulting interconnected web has had sufficient tensile strength so that it may be provided to the machine and processed without breaking at the splice.

A drawback to conventional splicing techniques is that the splice has not been sufficiently liquid-permeable, and therefore, has been inadequate for use in an absorbent article. In the past, fibrous absorbent materials have been joined by an adhesive, or by an adhesive tape where the absorbent materials have not had sufficiently smooth surfaces which readily hold an adhesive. Adhesives and tape have been substantially impermeable to the liquids appointed for absorption. The adhesives and tape have hindered liquid from being absorbed by the absorbent structure of the article and have degraded the effectiveness of the article. In addition, the splices may be readily seen in the finished product, giving the perception of low quality. As a result, it is necessary to cull all spliced regions of the absorbent material, or to cull all articles that may have incorporated a portion of a spliced region. In practice, as many as seven articles have been culled per splice, producing a costly loss in efficiency and a costly waste of material.

BRIEF DESCRIPTION OF THE INVENTION

Generally stated, a method aspect of the present invention can provide a process for splicing a first section of absorbent material to a second section of absorbent material to form a longer, continuous length of absorbent material suitable for a substantially uninterrupted sequential in-feed to a processing machine. The process includes a placing of a trailing end of a first portion of absorbent material in a position that substantially overlaps a leading end of a second portion of absorbent material to provide an overlapped splicing region. The trailing end of the first portion can be attached to the leading end of the second portion along at least a part of the overlapped splicing region with a thermal bond that provides a splice between the first portion of absorbent material and the second portion of absorbent material. In a particular feature, the trailing end of the first portion can be generally aligned with the leading end of the second portion. In another feature, the splice can have an operative tensile strength which is sufficient to support the sequential in-feed.

An article aspect of the invention can provide a substantially continuous length of absorbent material for a substantially uninterrupted sequential in-feed to a processing machine. The length of absorbent material can include a first portion of absorbent material having a trailing end, and a second portion of absorbent material having a leading end. The trailing end of the first portion of absorbent material can be placed in a position that substantially overlaps the leading end of the second portion of absorbent material to provide an overlapped splicing region, and in a particular feature, the trailing end of the first portion can be attached to the leading end of the second portion along at least a part of the overlapped splicing region with a thermal bond that provides a splice between the first portion of absorbent material and the second portion of absorbent material. In another feature, the splice can have an operative tensile strength which is sufficient to support a sequential in-feed to a processing operation. In a further feature, the leading end of the second portion of absorbent material can be generally aligned with the trailing end of the first portion of absorbent material In another aspect, the invention can provide a personal care absorbent article having a spliced absorbent material. The article includes a liquid permeable bodyside liner for placement adjacent a wearer; and an absorbent core connected to the body side liner for absorbing liquid passing through the liner. The absorbent core includes a first portion of absorbent material, and a second portion of absorbent material. A trailing end of the first portion of absorbent material is placed in a position that substantially overlaps a leading end of the second portion of absorbent material to provide an overlapped splicing region. In a particular feature, the trailing end of the first portion can be attached to the leading end of the second portion along at least a part of the overlapped splicing region with a thermal bond that provides a splice between the first portion of absorbent material and the second portion of absorbent material. In another feature, the splice can have an operative tensile strength which is sufficient to support the sequential in-feed.

Additional aspects and features of the present invention are set forth in and are readily derived from the present disclosure.

BRIEF DESCRIPTION OF THE DRAWINGS

The present invention will be more fully understood and further advantages will become apparent when reference is made to the following detailed description of the invention and the drawings, in which:

FIG. 1A is a fragmentary, schematic, side elevational view of a continuous length of absorbent material of a first embodiment of the present disclosure;

FIG. 1B is a fragmentary, schematic, plan view of the length of absorbent material shown in FIG. 1A;

Corresponding reference characters indicate corresponding parts throughout the views of the drawings.

DETAILED DESCRIPTION OF THE INVENTION AND PREFERRED EMBODIMENTS

Figure 2A:
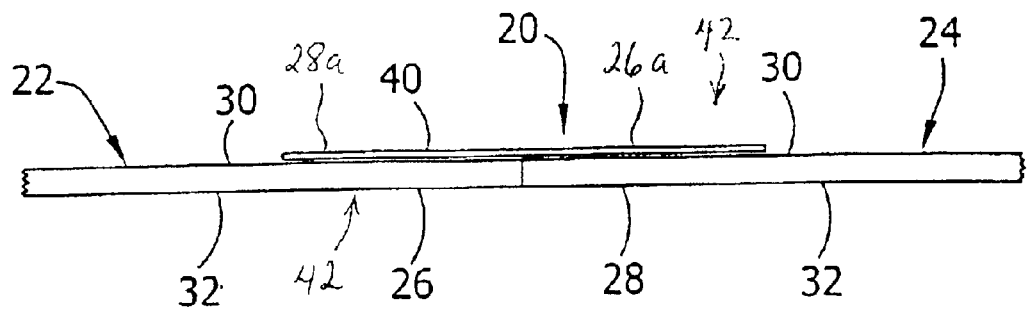
FIG. 2A is a fragmentary, schematic, side elevational view of a continuous length of absorbent material of a second configuration of the present disclosure.

It should also be noted that, when employed in the present disclosure, When introducing elements, components or features of the present disclosure or the particular configuration(s) thereof, the terms "a", "an", "the" and "said" are intended to mean that there may be one or more of the elements. The terms "including", "having", "comprises", "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Referring now to the drawings and in particular to FIGS. 1A and 1B, a continuous length of absorbent material is indicated generally at 20. The length of material 20 generally includes first and second portions of absorbent material, designated 22 and 24, respectively, which are serially supplied to a processing machine (not shown) for converting the absorbent material into absorbent articles.

The length of material 20 made according to the present invention is useable in absorbent articles, including, but not limited to, disposable diapers, training pants, other infant care products, other child care products, feminine napkins, panty liners, interlabial pads, other feminine care products, incontinence articles, and other adult care products. Typically, the articles are disposable and not intended for washing and reuse. An exemplary article which may be configured to include the length of material described herein is disclosed in U.S. Pat. No. 6,160,197 issued Dec. 12, 2000 and entitled ABSORBENT ARTICLE HAVING A BODY-ACCOMMODATING ABSORBENT CORE by Lassen et al., which is hereby incorporated by reference in a manner that is consistent herewith. Briefly, the Lassen et al. reference discloses a feminine hygiene product and more particularly a sanitary napkin having a liquid-pervious cover or bodyside liner, a substantially liquid-impervious or substantially liquid-impermeable baffle positioned opposite the bodyside liner, and an absorbent core positioned between the bodyside liner and the baffle. The baffle may alternatively be referred to an outer cover or a backsheet layer.

In a method aspect, the present invention can provide a process for splicing a first section of absorbent material to a second section of absorbent material to form a longer, continuous length 20 of absorbent material suitable for a substantially uninterrupted sequential in-feed to a processing machine or system. The process includes a placing of a trailing end 26 of a first portion 22 of absorbent material in a position that substantially overlaps a leading end 28 of a second portion 24 of absorbent material to provide an overlapped splicing region 42. The trailing end 26 of the first portion 22 can be attached to the leading end 28 of the second portion 24 along at least a part of the overlapped splicing region 42 with a thermal bond that provides a splice between the first portion of absorbent material and the second portion of absorbent material. In a particular feature, the trailing end 26 of the first portion 24 can be at least generally or approximately aligned with the leading end 28 of the second portion 26. In another feature, the splice can have an operative tensile strength which is sufficient to support the sequential in-feed.

An article aspect of the invention can provide a substantially continuous length 20 of absorbent material for a substantially uninterrupted sequential in-feed to a processing machine. The length of absorbent material can include a first portion 22 of absorbent material having a trailing end 26, and a second portion 24 of absorbent material having a leading end 28. The trailing end 26 of the first portion 22 of absorbent material can be placed in a position that substantially overlaps the leading end 28 of the second portion 24 of absorbent material to provide an overlapped splicing region 42, and in a particular feature, the trailing end 26 of the first portion 22 can be attached to the leading end 28 of the second portion 24 along at least a part of the overlapped splicing region 42 with a thermal bond that provides a splice between the first portion 22 of absorbent material and the second portion 24 of absorbent material. In another feature, the splice can have an operative tensile strength which is sufficient to support the sequential in-feed. In a desired feature, the trailing end 26 of the first portion 24 can be arranged to be in substantially direct contact with the leading end 28 of the second portion 26.

In another aspect, the invention can provide a personal care absorbent article that includes an absorbent material having a splice therein, and can provide a technique for producing the article. The article and technique of the invention can include a providing of a liquid permeable bodyside liner 44 (e.g. FIG. 7) which is intended for placement operatively adjacent a wearer; and a providing of an absorbent core 48 which is attached or otherwise joined to the bodyside liner for absorbing or otherwise retaining liquid that passes through the liner. The absorbent core is configured to include a first portion 22 of absorbent material, and at least a second portion 24 of absorbent material. A trailing end 26 of the first portion 22 of absorbent material is placed in a position that substantially overlaps a leading end 28 of the second portion 24 of absorbent material to provide an overlapped splicing region 42. In a particular feature, the trailing end 26 of the first portion 22 can be attached to the leading end 28 of the second portion 24 along at least a part of the overlapped splicing region 42 with a thermal bond that provides a splice between the first portion 22 of absorbent material and the second portion 24 of absorbent material. Another feature can include an overlapping of the first portion of absorbent material into a substantially direct contact with the second portion of absorbent material. The substantially direct contact can be located along at least the portion of the overlapped splicing region 42 over which the selected thermal bond provides the desired splice between the first portion of absorbent material and the second portion of absorbent material. In further feature, the splice can have an operative tensile strength which is sufficient to support a sequential in-feed to a selected processing operation, particularly a process operation that has been employed to produce the article.

In the various configurations of the invention, the trailing end 26 of the first portion 24 of absorbent material can be arranged to be in substantially direct contact with the leading end 28 of the second portion 26 of absorbent material. The substantially direct contact can be located along at least the portion of the overlapped splicing region 42 over which the selected thermal bond provides the desired splice and splicing interconnection between the first portion of absorbent material and the second portion of absorbent material. In desired arrangements, the composition of the first portion 22 of absorbent material can configured to be substantially the same as the composition of the second portion 24 of absorbent material. The composition of the first portion 22 of absorbent material can optionally be configured to differ from the composition of the second portion 24 of absorbent material.

In another feature, the various arrangements of the invention can be configured to provide or include a stabilized, airlaid, nonwoven absorbent material. In another feature, the bulk thickness of the overlapped splicing region 42 can be reduced during the ultrasonic splicing process. For example, a pressure applied during the bonding operation can be configured to reduce the thickness of the resulting splice. As a result, the thickness of the two overlapped portions of material can approach, or even be less than that of a single layer of the material. Also, a density of the overlapped material in the splicing region can be approximately doubled. A further desired aspect of the various configurations of the invention can include a configuring of at least the lateral side edges of the leading end 28 of the second portion 24 of absorbent material to be substantially or at least generally aligned with the lateral side edges of the trailing end 26 of the first portion 22 of absorbent material.

Still another feature In the various arrangements of the invention is provided by a splicing region 42 which has a liquid permeability that is sufficient to allow a placement of the splicing region in a commercially-acceptable absorbent article. Accordingly, the splicing region has a configuration that does not excessively inhibit the distribution and/or intake of the absorbed liquid. In a particular aspect, the liquid permeability of the splicing region can be approximately as great as a liquid permeability of the first portion of absorbent material and approximately as great as a liquid permeability of the second portion of absorbent material. In a further aspect, the liquid permeability of the splicing region can be at least about as great as a liquid permeability of the first portion of absorbent material and at least about as great as a liquid permeability of the second portion of absorbent material. The absorbent properties may be significantly reduced in the immediate area over which the actual ultrasonic bond or other thermal bond is formed. The area of the actual, formed bonding can, however, be kept particularly small and localized. As a result, the effective absorbent properties, such as liquid-permeability, in the overall splicing region 42 of the spliced web length 20 can be maintained at adequate levels. Additional aspects and features of the present invention are set forth in and are readily apparent from the present disclosure.

By incorporating its various aspects and features, the present invention can provide an improved process that can be more efficiently and more economically operated. The spliced absorbent web and other articles of the invention can be produced with less waste and less delay. Additionally, the spliced absorbent web and other articles of the invention can be produced with desired levels of strength, liquid-permeability and absorbency.

With reference to FIGS. 1A and 1B, the process and apparatus of the invention can have an appointed machine-direction 34 which extends longitudinally, and an appointed, lateral cross-direction 36 which extends transversely. For the purposes of the present disclosure, the machine-direction 34 and is the direction along which a particular component or material is transported length-wise along and through a particular, local position of the apparatus and method. The cross-direction 36 lies generally within the plane of the material being transported through the process, and is aligned perpendicular to the local machine-direction 34.

In the various arrangements of the invention, and during the manufacture of desired absorbent articles, the absorbent material can be introduced into the processing machine or system from a suitable supply. For example, the absorbent material may be delivered from an array of supply rolls (not shown), or may be supplied from an upstream, inline manufacturing operation. Alternatively, other supply configurations of the absorbent material may also be employed. For example, the supply of material may be configured as one or more festooned ribbons or strips.

The first portion of absorbent material 22 has a trailing end region 26. The second portion of absorbent material 24 has a leading end region 28. Typically, the first and second portions 22, 24 of material are identical or similar in all respects, but they may be slightly or significantly different without departing from the scope of the present invention. For example, the differences between the first portion 22 and the second portion 24 may include the parameters of material composition, permeability, density, basis weight and the like, as well as combinations thereof.

Figure 2B:
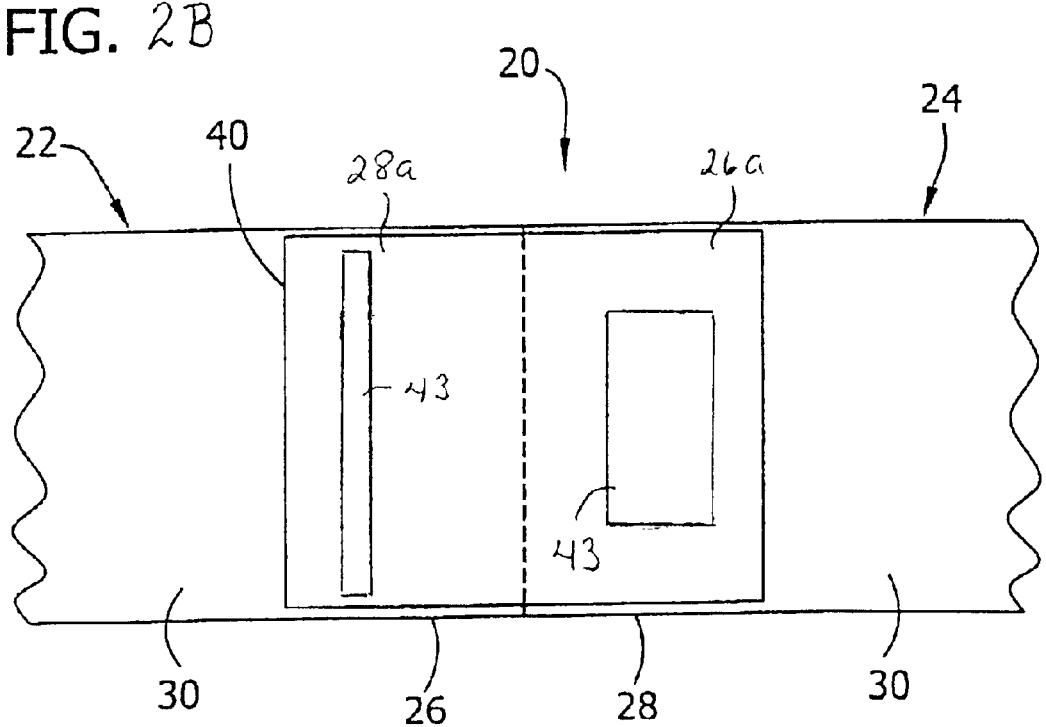
FIG. 2B is a fragmentary, schematic, plan view of a length of absorbent material of the second configuration of the disclosure.

With reference to FIGS. 2A and 2B, a particular arrangement of the process can be configured to splice a first portion of absorbent material to a second portion of absorbent material to form a longer, continuous length of absorbent material suitable for uninterrupted sequential in-feed to a processing machine. The process can include the steps of placing a trailing end of the first portion adjacent a leading end of the second portion, and aligning the trailing end of the first portion with the leading end of the second portion. A piece of splicing material 40 may be attached to the trailing end of the first portion and the leading end of the second portion. The piece of splicing material can be configured to have a liquid permeability that is at least about as great as a liquid permeability of the first portion of absorbent material. Additionally, the liquid permeability of the splicing material can be at least about as great as a liquid permeability of the second portion of absorbent material.

Another aspect of the invention can provide a continuous length of absorbent material which is arranged to provide a substantially uninterrupted, sequential in-feed to a processing machine. The length includes a first portion of absorbent material having a trailing end and a second portion of absorbent material having a leading end adjacent to and aligned with the trailing end of the first portion of absorbent material. A piece of splicing material 40 can be attached to the trailing end of the first portion and the leading end of the second portion of absorbent material. The splicing material has a liquid permeability at least about as great as a liquid permeability of the first portion of absorbent material and at least about as great as the second portion of absorbent material.

In yet a further aspect, a personal care absorbent article according to the present disclosure can have a spliced absorbent material. The article comprises a liquid permeable body side liner for placement adjacent a wearer. An absorbent core is attached to the body side liner for absorbing liquid passing through the liner. The absorbent core includes a first portion of absorbent material, a second portion of absorbent material, and can include a piece of splicing material attached to the first and second portions of absorbent material. If included, the splicing material can have a liquid permeability at least about as great as a liquid permeability of the first portion of absorbent material and at least about as great as the second portion of absorbent material.

In the various arrangements of the invention, the trailing end 26 of the first portion of absorbent material can be placed operatively adjacent the leading end 28 of the second portion of absorbent material, and the ends can be operatively aligned. As illustrated in FIGS. 1A and 1B, for example, the longitudinally-extending, terminal side edges of the trailing end 26 of the first portion 22 can be substantially aligned with the longitudinally-extending, terminal side edges of the leading end 28 of the second portion 24. The lateral side edges of the trailing end 26 of the first portion 22 may or may not be substantially coterminous with the lateral side edges of the leading end 28 of the second portion 24, as desired.

As illustrated in FIGS. 2A and 2B, the ends can be laterally and vertically aligned, as. As representatively shown, the ends 26, 28 can be placed squarely end-to-end to provide a butt joint. The ends may be in direct, contacting engagement, or may be spaced apart with a small gap between the ends. The placing of the ends 26, 28 at the selected position may be done manually, or by employing an automated machine. An end-to-end arrangement can result in better product comfort than an arrangement with the ends overlapped because the end-to-end arrangement can be thinner and less bulky. Each of the portions 22, 24 has a first face 30 and an opposite second face 32. The respective first faces 30 of the first and second portions 22, 24 are oriented in an identical direction (e.g., vertically upward, as shown in the drawings). Similarly, the respective second faces 32 are oriented in an identical direction (e.g., vertically downward). It is understood that the faces 30, 32 may be oriented in non-identical directions without departing from the scope of this invention.

A piece of splicing material 40 can be positioned adjacent the trailing end 26 of the first portion 22 and the leading end 28 of the second portion 24 for attachment thereto. The piece of splicing material 40 engages at least one of the faces 30, 32 of each of the ends. For the arrangement shown in FIGS. 2A and 2B, the piece of splicing material 40 is positioned adjacent the first face 30 of the trailing end 26 of the first portion and the first face 30 of the leading end 28 of the second portion.

In a particular feature, the splicing material 40 can be composed of material or materials that are similar to or substantially the same as the material or materials that are employed in the first portion of absorbent material 22 and/or the second portion of absorbent material 24. Accordingly, an absorbent splicing material can be configured to provide a trailing end region 26a of absorbent material, and a leading end region 28a of absorbent material.

The relative sizes, dimensions and other physical properties (e.g. permeabilities, densities and/or basis weights) of the splicing material 40, and the first and second portions of absorbent material 22, 24 may or may not be the same. In a desired arrangement, the piece of splicing material 40 can be slightly narrower than the first and second portions 22, 24 of absorbent material so that it does not extend beyond the lateral sides of the material, but yet covers a sufficient shear area to produce an effectively strong splice. The piece of splicing material 40 should overlap each portion of absorbent material in the longitudinal direction by a length sufficient to form a strong splice. For example, portions 22, 24 of absorbent material having a width of about 37 mm may be joined by splicing material 40 having a longitudinal overlap of at least about 25 mm per end (producing a total length of splice of about 50 mm), and more desirably a longitudinal overlap of at least about 50 mm.

In one representative embodiment, the piece of splicing material 40 can be attached to the respective ends 26, 28 of the first and second portions of absorbent material by compressing the arrangement and applying heat energy. The attachment can be made using a conventional compression device (not shown), such as a press, anvil, or set of plates which are pressed together. The heat may originate from a surface source (such as a heated compression device), from a hot air source such as a through-air bonding technique, or from the application of ultrasonic energy. The applications of heat and pressure occur simultaneously for a period of time so that the splicing material and/or a binding agent of the absorbent material soften or begin to melt and bind together upon cooling. These techniques are conventional, and are well understood by those of ordinary skill in the art.

Significantly, the piece of splicing material 40 can be configured to have a liquid permeability that is approximate to, or at least as great as the first and second portions 22, 24 of absorbent material. Therefore, the splice will not excessively hinder passage of liquid to the absorbent material when incorporated into an article. Further, the splicing material can have a tensile strength at least as great as a tensile strength of the absorbent material so that the splice is strong and will not rupture when processed into an article.

The absorbent material, and particularly the first and/or second portions 22, 24 of absorbent material, may include cellulosic fibers (e.g., wood pulp fibers), other natural fibers, synthetic fibers, superabsorbent material in the form of particles or fibers, binder materials, surfactants, selected hydrophobic materials, or the like, PET fiber, bicomponent fiber, latex, as well as combinations thereof, and other materials suitable to improve absorbent performance and/or web processing. Desirably, the absorbent material can be a stabilized absorbent material has between 2% and 50% polymer content by weight. Additionally, the absorbent material can be an airlaid material.

In a particular feature, the first and/or second portions of absorbent material can be configured to include at least a minimum of about 6 wt % of substantially thermoplastic or otherwise melt-processible, binder material (e.g. binder fiber). For example, the binder material may be T255 binder fiber available from KoSa, a business having offices located in Houston, Tex., U.S.A. Accordingly, the binder fiber or other binder material can provide an operative melt-fusible bond between the appointed components and component portions. The melt-fusible bond can be thermal bonding techniques, particular ultrasonic bonding techniques. The amount of binder material can alternatively be at least about 8 wt %, and can optionally be at least about 10 wt % to provide improved process and product performance. In an additional aspect, the binder material can be provided in an amount of not more than a maximum of about 25 wt %. The amount of binder material can alternatively be not more than about 20 wt %, and can optionally be not more about 15 wt % to provide improved cost savings and efficiencies.

With airlaid materials having relatively low amounts of binder fiber, it has been surprisingly found that a separately provided component of splicing material can be eliminated. Bonds of sufficient strength can be formed by applying ultrasonic energy to an appointed splicing region wherein a first portion of absorbent material is overlapped into direct contract with a second portion of absorbent material to form an effective splice. In a particular feature, the absorbent material can be a stabilized airlaid material.

In another feature, the splice can be provided with a tensile strength of at least about 600 grams per inch (about 236 g/cm) of cross-directional width of the formed splice. The splice can alternatively be provided with a tensile strength which is substantially equal to or greater than a tensile strength of the first and/or second portions of absorbent material. Optionally, the splice can alternatively be provided with a tensile strength which is less than a tensile strength of the first and/or second portions of absorbent material to provide desired levels of flexibility, processibility, absorbency, and/or other liquid-handling properties. The splice should, however, have sufficient tensile strength to operatively support a sequential in-feed to the desired processing operation Accordingly, in the various configurations of the invention, the thermal bond employed to attach appointed regions of the selected components, such as the splicing material and/or the first and second portions of absorbent material, can desirably be an ultrasonic bond. For example, the attaching of the trailing end 26 of the first portion 22 of absorbent material to the leading end 28 of the second portion 24 of absorbent material along at least a part of the overlapped splicing region 42 can be accomplished by employing the ultrasonic bond.

Additionally, the ultrasonic bond or other thermal bond can be configured in any operative array or pattern. For example, the bond may include a regular or irregular pattern of one or more individual, isolated bonds 43, and each individual bond can have a selected shape. The shape can include stripes, squares, rectangles, dots, curves, polygons, other regular or irregular geometric shapes or the like, as well as combinations thereof. The bond may, for example be provided by a single, contiguous area of bonding, and the contiguous area may have any desired shape, such as a rectangular shape. As representatively shown in FIGS. 1A and 1B, the bond in the splicing region 42 can alternatively include a bonding pattern having a plurality of substantially segregated, localized bonds 43. The actual bonding areas of the individual, localized bonds 43 are relatively small, and are operatively spaced-apart to provide substantially unbonded areas therebetween. Even if the absorbent properties might be significantly reduced in the immediate area over which the actual ultrasonic bond or other thermal bond is formed, the effective absorbent properties, such as liquid-permeability, in the overall splicing region 42 of the spliced web length 20 can be maintained at adequate levels.

In addition, the thermal bond can desirably be generated or otherwise configured so that within the splicing region the appointed portions of absorbent material are substantially free of excessive scorching or other discoloration. Toward this end, the ultrasonic bond or other thermal bond can be generated by employing selectively controlled levels of power input that are below a threshold level that would produce undesired, excessive scorching.

The process is configured to provide an operative bonding time for forming an adequate, connecting splice. In a particular aspect, the process of the invention can be configured to provide an ultrasonic bonding time, or other thermal bonding time, of not more than a maximum of about 6 sec. The bonding time can alternatively be not more than about 5 sec, and can optionally be not more than about 3 sec. If the bonding times are too long, there may be an undesired disruption of the manufacturing process or an undesired amount of accumulating equipment may be needed to compensate for the extended bonding time.

In the spliced web produced with the process of the invention, the employed absorbent material is typically capable of retaining liquid to provide a saturated capacity of at least about 3 g/g, and about 10 g of liquid per 0.1 square meter of material as measured under a pressure of 0.5 psi. The saturated capacity can be determined by employing a conventional saturated capacity test method that is well known in the art. Further, the material holds together when dry or at any level of liquid saturation. A dry tensile strength property of the material is typically in the range of 0.1–6 kg per cm of material width. Example materials include an airlaid absorbent bonded with a thermally bondable fiber (e.g., bicomponent sheath/core fibers such as KoSa T-255 or Chisso ESC fibers), an airlaid absorbent bonded with dried latex, airlaid absorbents bonded by hydrogen bonding, and wetlaid absorbents.

With regard to the process of the invention, the absorbent materials are typically formed by employing conventional airlaying techniques which are well known in the art. For example, it is common to utilize a fibrous sheet of cellulosic or other suitable absorbent material which is fiberized or otherwise disintegrated in a conventional fiberizer, or other shredding or comminuting device, to form discrete fibers. In addition, particles of superabsorbent material can be mixed with the individual, discrete fibers. The fibers and superabsorbent particles are then entrained in an air stream and directed to a foraminous forming surface upon which the fibers and superabsorbent particles are deposited to form a fibrous web of absorbent material. In addition, bonding agents or other strengthening components may be incorporated to provide a stabilized web. The bonding agent may be provided by binder fibers that have been incorporated into the airlaid web, and the airlaid web can be heat-set in an oven to activate the binder fibers and generate thermal bonds between the binder fibers and other web components. The web of absorbent material may then be stored or immediately directed for further processing and assembly with other components to produce a final absorbent article.

Other techniques are also employed to form stabilized absorbent webs. Such techniques include: dry-forming techniques, wet-laying techniques, foam-forming techniques, and various wet-forming techniques. The resulting absorbent webs have included absorbent fibers, natural fibers, synthetic fibers, superabsorbent materials, binders, and strengthening components in desired combinations. The stabilized webs may be employed to generate preformed absorbent sheets or layers, and the preformed material may be stored in a preformed supply, such as provided by a supply roll. At an appropriate time, the preformed layer may be delivered from the preformed supply into a manufacturing line.

Suitable stabilized absorbents containing superabsorbent powders for urine absorbing applications typically have a basis weight in the range of about 80–1000 gsm and a web density of about 0.03–0.35 g/cm$^3$. Suitable stabilized airlaid absorbents not containing superabsorbent powders for feminine hygiene or other applications typically have a basis weight in the range of about 60–500 gsm (g/m$^2$) and a web density of about 0.03–0.25 g/cm$^3$. The low density and high basis weight of these materials cause lower than desired roll lengths, forcing the need for a more than desirable number of splices.

Superabsorbent materials are well known in the art, and are readily available from various suppliers. For example, FAVOR 880 superabsorbent is available from Stockhausen, Inc., a business having offices located in Greensboro, N.C., U.S.A.; and DOW 2035 is available from Dow Chemical Company, a business having offices located in Midland, Mich., U.S.A.

Airlaid absorbent materials are also well known in the art. For example, suitable stabilized airlaid materials are available from Concert Fabrication Ltee', a business having offices located in Vancouver, British Columbia, Canada.

In particular features of the invention, the absorbent material of the portions 22, 24 can have an absorbent capacity of at least about 9 g/g employing 0.9 wt % saline (9 grams of 0.9 wt % saline per gram of absorbent material). It can also have a tensile strength value of at least about 1.7 N/cm (Newtons per cm of "width" of the material, where the "width" direction is perpendicular to the applied force). However, the web of absorbent material can be provided with a tensile strength value of up to about 100 N/cm, or more. Where the splicing material is an absorbent material, the splicing material may be configured to have the same or similar properties.

Desirably, the splicing material of the piece 40 is meltcompatible with the binder fiber of the absorbent material. One type of splicing material is a carded web comprising bicomponent fibers used to stabilize absorbent structures. Other polymer options for splicing material include polyethylene, polypropylene, and other polyolefins. A web comprised of a blend of polymer fibers may also provide a splicing material of good quality. For example, a bonded, carded web comprised of a blend of bicomponent and polyester staple fibers may be a useful splicing material. Beyond bonded carded webs, the splicing material may include spunbond, meltdown, SMS, BFDL, hydroentangled nonwovens, and other nonwoven material comprised in part of a polymer compatible with the synthetic binding material providing stability to the absorbent material to be spliced. Alternatively, the splicing material may be adhesively covered to assist the thermal bonding of the stabilized absorbent. Desirably, the splicing material has a very permeable, open structure.

In a particular feature, the splicing material 40 may be similar to or substantially the same as the absorbent material in the spliced absorbent web. More particularly, the splicing material 40 can be composed of substantially the same material or materials that are employed in the first portion of absorbent material 22 and/or the second portion of absorbent material 24. The physical properties of the splicing material 40 (e.g. the relative size, dimensions, absorbency, permeability, density and/or basis weight) may or may not be the same as those exhibited in the first and second portions of absorbent material 22, 24.

The splicing material should not excessively impede liquid intake. Accordingly, the splicing material is desirably more liquid permeable than the absorbent material(s) being spliced together. Further, it is desirable for the absorbent material with the splicing material attached to be about as permeable as absorbent material without the splicing material attached.

The splicing material is sufficiently strong to be processed through the processing machine. Preferably, the splice material has a tensile strength at least as great as a tensile strength of the absorbent material.

Figure 3A:
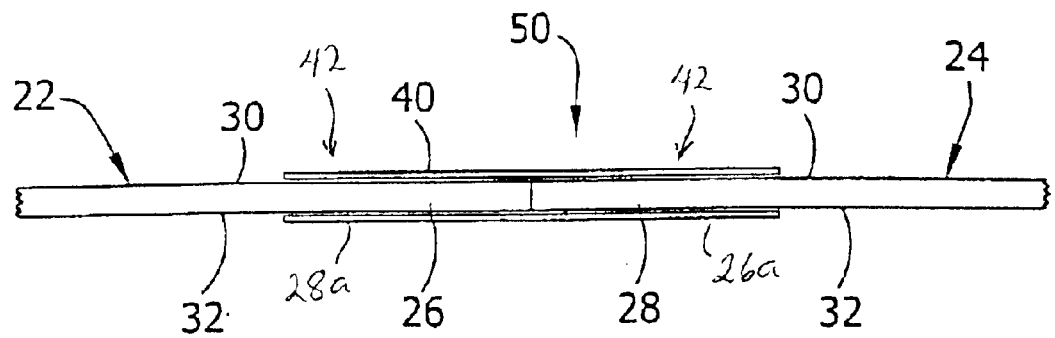
FIG. 3A is a fragmentary, schematic, side elevational view of a continuous length of absorbent material of a third configuration of the present disclosure.
Figure 3B:
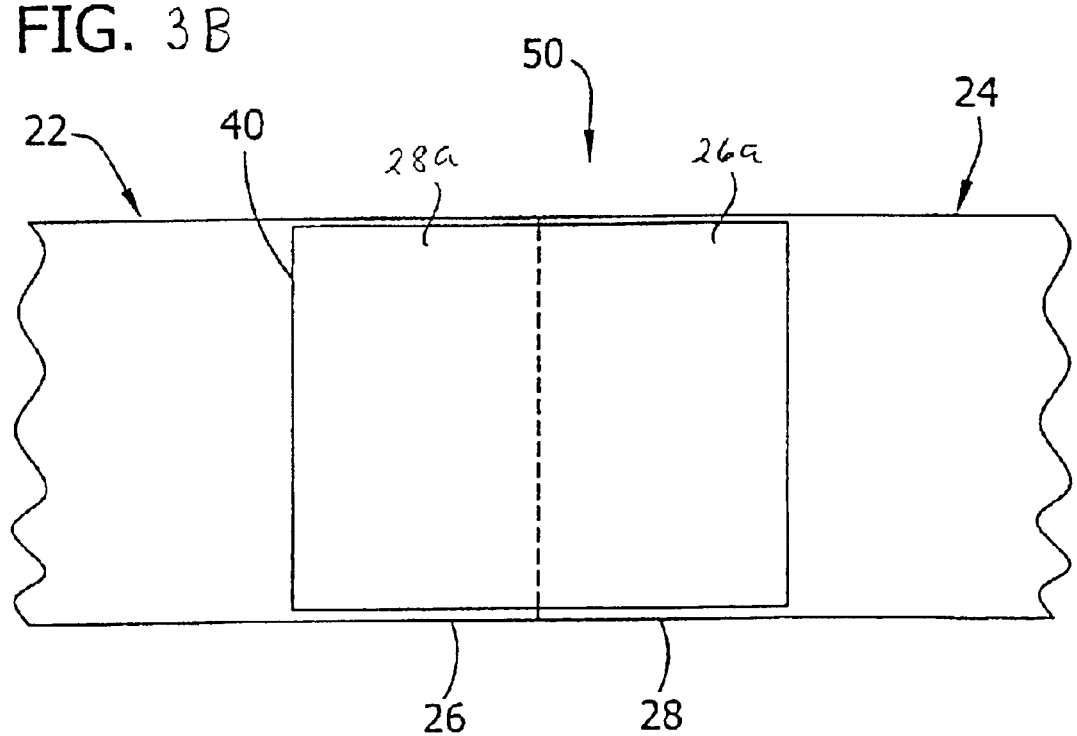
FIG. 3B is a fragmentary, schematic, plan view of a length of absorbent material of the third configuration of the disclosure.

A third configuration 50 of a continuous length of absorbent material includes two pieces of splicing material 40 on opposite faces of the ends, as representatively shown in FIGS. 3A and 3B. A second piece of splicing material 40 is placed on the second face 32 of the trailing end 26 of the first portion of absorbent material and the second face 32 of the leading end 28 of the second portion of absorbent material. The second embodiment 50 has the advantage of a stronger splice because in provides more shear area and more crosssectional area of splice material. Alternatively, the second embodiment may permit use of splicing material pieces having narrower widths without reducing the strength of the splice. Where the splicing material is or includes an absorbent material, the absorbent splicing material can provide an absorbent trailing end region 26a and an absorbent leading end region 28a.

Figure 4A:
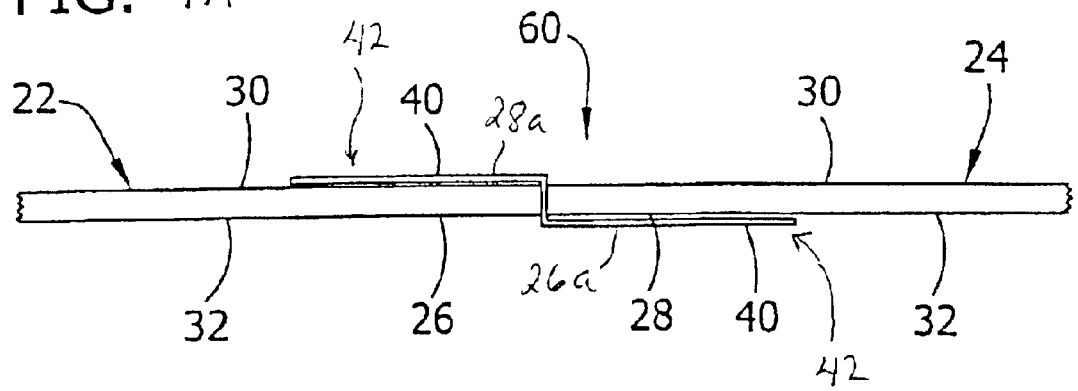
FIG. 4A is a fragmentary, schematic, side elevational view of a continuous length of absorbent material of a fourth configuration of the present disclosure.
Figure 4B:
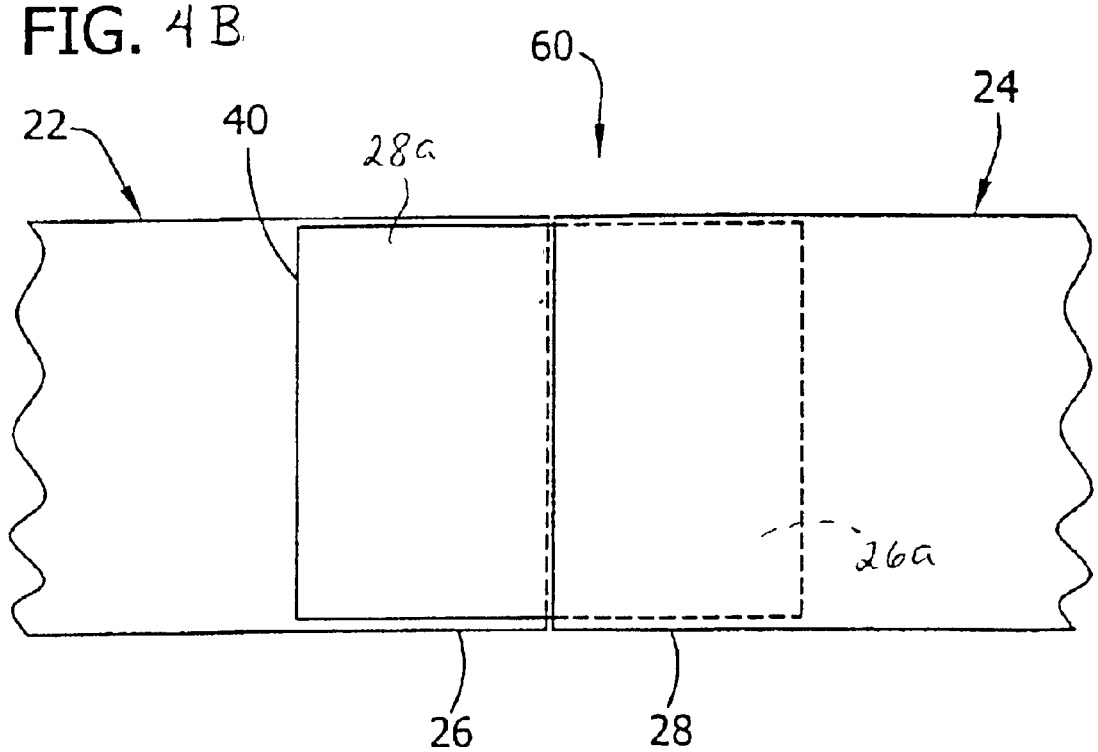
FIG. 4B is a fragmentary, schematic, plan view of a length of absorbent material of the fourth configuration of the disclosure.

A fourth configuration 60 of a continuous length of absorbent material, as representatively shown in FIGS. 4A and 4B, places the piece of splicing material 40 on the first face 30 of the trailing end 26 of the first portion and the second face 32 of the leading end 28 of the second portion. The splicing material can be or include an absorbent material, and the absorbent splicing material can provide an absorbent trailing end region 26a and an absorbent leading end region 28a.

Figure 5A:
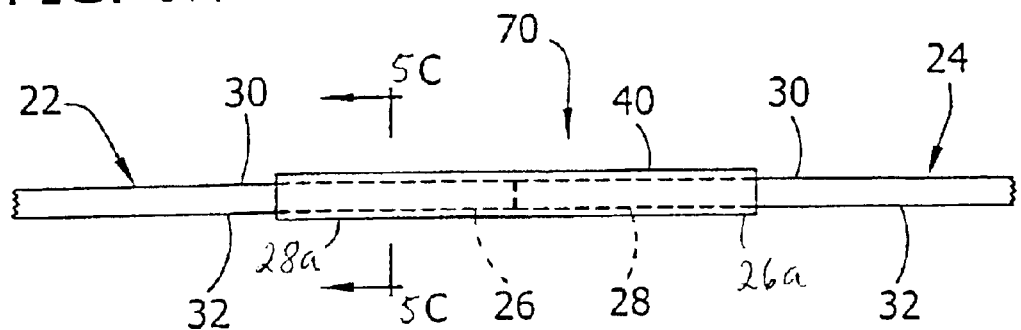
FIG. 5A is a fragmentary, schematic, side elevational view of a continuous length of absorbent material of a fifth configuration of the present disclosure.
Figure 5B:
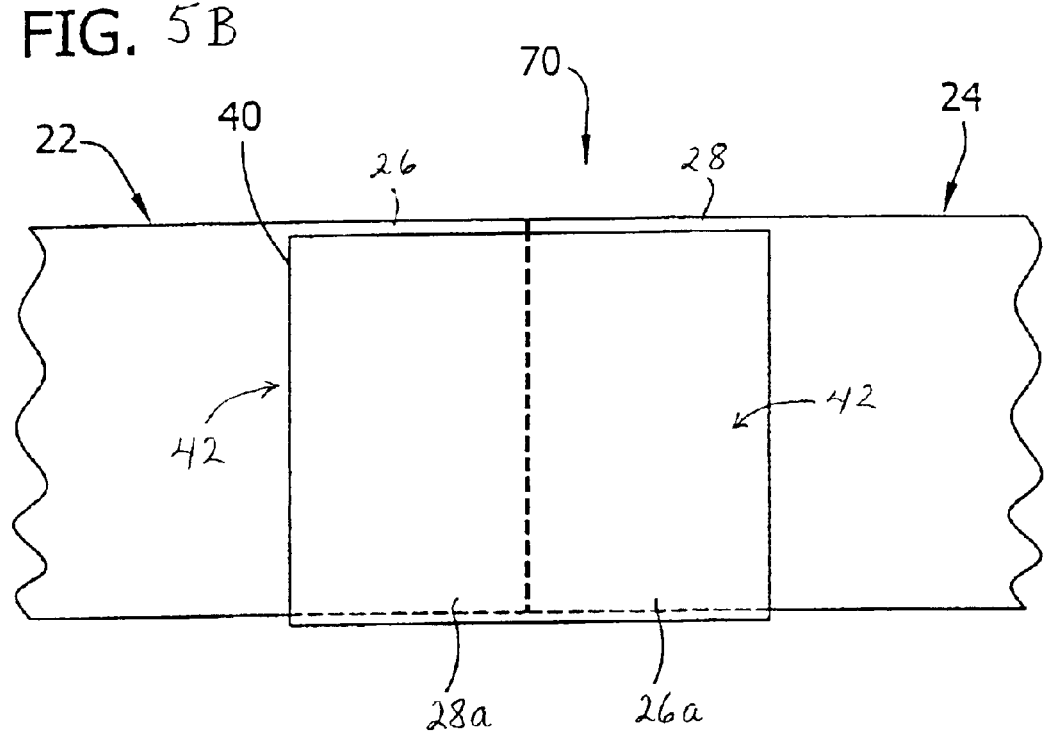
FIG. 5B is a fragmentary, schematic, plan view of a length of absorbent material of the fifth configuration of the disclosure.
Figure 5C:
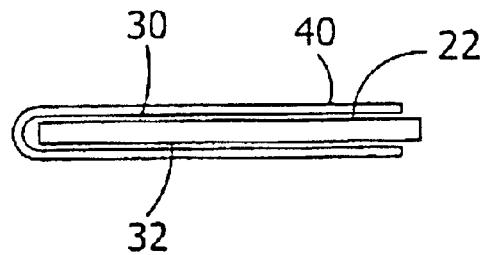
FIG. 5C is a view taken on line 5C—5C of FIG. 5A.

A fifth configuration 70 of a continuous length of absorbent material, as representatively shown in FIGS. 5A, 5B, and 5C, can wrap the piece of splicing material 40 around a lateral side edge and onto both faces 30, 32 of the ends 26, 28. Where the splicing material is or includes an absorbent material, the absorbent splicing material can provide an absorbent trailing end region 26a and an absorbent leading end region 28a.

Figure 6A:
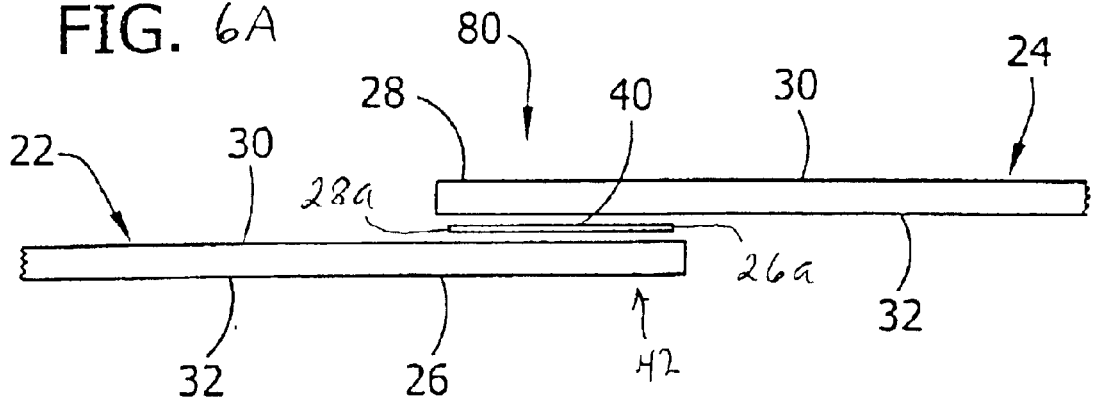
FIG. 6A is a fragmentary, schematic, side elevational view of a continuous length of absorbent material of a sixth configuration of the present disclosure.
Figure 6B:
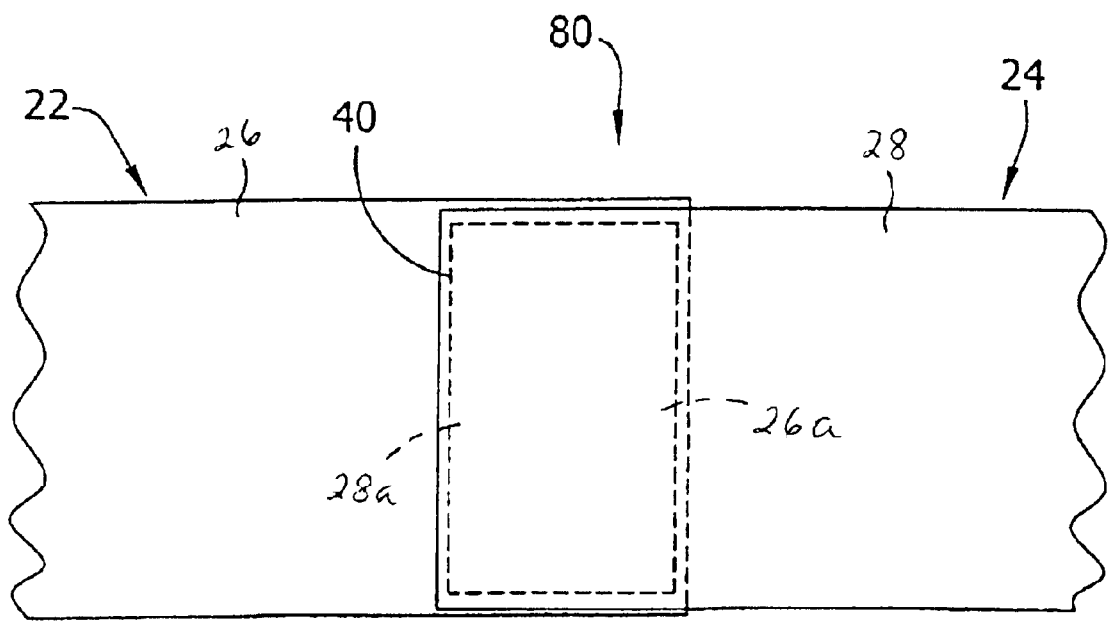
FIG. 6B is a fragmentary, schematic, plan view of a length of absorbent material of the sixth configuration of the disclosure.

A sixth arrangement 80 of a continuous length of absorbent material, as representatively shown in FIGS. 6A and 6B, can place the piece of splicing material 40 in a sandwiched position between overlapping ends 26, 28 of the first portion and the second portion. The splicing material may be or include an absorbent material, and the absorbent splicing material can provide an absorbent trailing end region 26a and an absorbent leading end region 28a.

Figure 7:
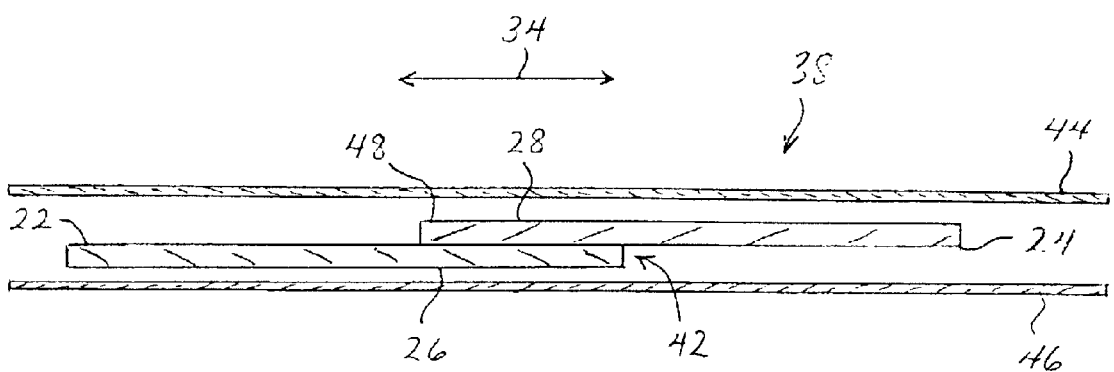
FIG. 7 is an expanded, side view of a cross-section through a representative article of the invention.

With reference to FIG. 7, a representative personal care absorbent article 38 can include an absorbent material 20 having a splice therein. The article can include a liquidpermeable bodyside liner 44 for placement adjacent a wearer, and may further include a backsheet or baffle layer 46. Other components may also be included to provide any conventional configuration for the personal care absorbent article, in a manner well known in the art. The liner 44 is sufficiently liquid-permeable to operatively pass liquids, such as menses and/or urine, through the thickness of the liner and into an absorbent core 48 at a desired rate. In a desired configuration, the backsheet can be operatively liquid-impermeable. Additionally, the liquid-impermeable backsheet may be configured to be permeable to water vapor and other gases. The absorbent core 48 can be attached or otherwise connected to the bodyside liner 44, and the absorbent core can be constructed and arranged to operatively absorb the liquids that pass through the liner 44. The absorbent core can include a first portion 22 of absorbent material having a trailing end region 26 which overlaps a leading end region 28 of a second portion 24 of absorbent material to provide an overlapped splicing region 42. In the splicing region, there are significant, extended areas of substantially direct contact between the overlapped regions of the first and second portions of absorbent material. A thermal bond, desirably an ultrasonic bond, provides an interconnecting splice between the first and second portions of absorbent material along at least an operative part of the overlapped splicing region. To form the desired personal care article 38, it should be readily appreciated that any operative combination of one or more of the other configurations of the splicing region 42 that are set forth in the present disclosure may be employed.

It is understood that other arrangements may also be used without departing from the scope of this invention. For example, an adhesive tape may be used in combination with any of these arrangements to further strengthen the splice. However, if such tape is used, it is likely that the manufactured articles containing that tape will need to be culled.

Each end 26, 28 of the portions of absorbent material is shown with generally square, right angles and the piece of splicing material is shown as having a rectangular shape. However, the absorbent material and piece(s) of splicing material 40 may have other shapes and angles without departing from the scope of this invention. Specifically, the ends 26, 28 of the portions of absorbent material may be angled or irregularly shaped, and pieces of splicing material 40 may have an irregular shape or a shape which does not match the shape of the ends. Further, the two ends 26, 28 of the portions of absorbent material need not have corresponding shapes. Gaps between the ends 26, 28 may be large and spanned by the piece of splicing material 40.

The following Examples are given to provide a more detailed understanding of the invention. The particular materials, dimensions, amounts and other parameters are exemplary, and are not intended to specifically limit the scope of the invention.

EXAMPLES 1 THROUGH 3

A splice composed of ultrasonic bonds was produced between strips of stabilized airlaid material. The bonding operation produced a melting and re-solidifying the sheath portion of the bicomponent fiber, and the splice bonds were formed where the melted sheath material in a first strip portion contacted a strip-component in a second strip portion. The heat source for the melting was ultrasonic energy.

Each of the airlaid strips were 37 mm wide along the cross-direction, and had a basis weight of 250 g/m$^2$. It should be readily appreciated that each of the strips could have a different width dimensions, and/or a different basis weight. Other airlaid material may also be employed. Sample materials are summarized in the following Table 1.

TABLE 1

|  | EXAMPLE-1 | EXAMPLE-2 | EXAMPLE-3 |
|---|---|---|---|
| Airlaid Material | CONCERT Thermal Bonded Airlaid Web; 90 wt % pulp fiber; 10 wt % binder fiber. | CONCERT (2.0 d. NF401) Thermal Bonded Airlaid Web; 90 wt % pulp fiber; 10 wt % binder fiber. | CONCERT (2.0 d. NF401) Thermal Bonded Airlaid Web; 90 wt % pulp fiber; 10 wt % binder fiber. |
| Woodpulp fibers | Weyerhaeuser NF405 Roll Fluff Pulp; southern pine softwood, kraft pulp. | Weyerhaeuser NF401 Fluff Pulp; southern pine softwood, kraft pulp. | Weyerhaeuser NF401 Fluff Pulp; southern pine softwood, kraft pulp. |
| Binder fibers | KoSa T255, 2.0 denier, 6 mm bicomponent binder fiber with a polyester or polypropylene core and a polyethylene sheath. | KoSa T255, 2.0 denier, 6 mm bicomponent binder fiber with a polyester or polypropylene core and a polyethylene sheath. | KoSa T255, 2.0 denier, 6 mm bicomponent binder fiber with a polyester or polypropylene core and a polyethylene sheath. |
| Basis Weight | 175 gsm | 250 gsm | 175 gsm |
| Density | 0.08 g/cc | 0.14 g/cc | 0.12 g/cc |
| Thickness | 2.19 mm | 1.79 mm | 1.46 mm |
| MD tensile strength | 1800 g @ 50 mm | 5000 g @ 50 mm | 2300 g @ 50 mm |
| Vertical wicking; Measured in saline at 60 sec. | 5.5 cm | 8.0 cm | 6.5 cm |
| Saturation Capacity | 12 g/g | 7.5 g/g | 9 g/g |
| Slit Width | 62 mm | 37 mm | 37 mm |
| Drape stiffness | 7.5 cm |  |  |
| MD elongation | 15.1% |  |  |

For each sample, the two strips of airlaid material were positioned such that the trailing end of one strip overlapped the leading end of the other strip by an amount sufficient to make an operative bond, and the lateral edges of one strip were approximately aligned with the lateral edges of the other strip. The area of overlap was positioned directly on top of an ultrasonic anvil. The anvil was provided by an 8 inch piece of conventional, ½ inch, key stock. A manually held, ultrasonic bonder head (ultrasonic horn stack) was positioned and held so that the tip of the horn stack was held at approximately a 90° right-angle, relative to the area of overlap, was pressed against the overlap, and was held as flat as practicable against the overlapped-region/anvil arrangement. A pressure was applied against the overlapped area at a level of approximately 90 lb/in² (approximately 620 KPa) and the ultrasonic bonder system was activated for approximately 2 seconds to make the bond. The resulting bond provided sufficient strength to allow the process of the spliced strip through a manufacturing process employed to make a feminine care article. In particular, the spliced material was employed to form a series of absorbent cores that were assembled into a corresponding series of feminine care, catamenial products. One or more of the products included therein a spliced region of the airlaid strip material.

In a particular arrangement, the ultrasonic bond had a rectangular shape which measured approximately 37 mm×13 mm. In another arrangement of the splicing region, the ultrasonic bond had the form of an array of generally circular dots having a diameter of about 0.5 mm. Each ultrasonic bond included a pattern of about 50 dot-bonds.

The ultrasonic generator and ultrasonic (horn) stack were obtained from Branson Ultrasonics, a business having offices located in Danbury, Conn., U.S.A.

EXAMPLES 4A THROUGH 4E
(Codes A through E)

The Examples tested are summarized in the following Table 2:

TABLE 2

| Code | Absorbent Description | | |
|------|----------------------|---|---|
| A | Airlaid fibrous web containing about a 50/50 blend of wood pulp fibers composed of bleached southern softwood kraft (either debonded, semi-debonded, or non-debonded) arranged in two, upper strata, and western softwood sulfite in two, lower strata. In each of the strata, the wood pulp fibers were mixed in a 90:10 ratio with KoSa T255 binder fiber. Total airlaid basis weight was 250 grams per square meter. This particular material had a density gradient from top to bottom. The density gradient may optionally be not present. The airlaid web was slit to a width of 37 mm. | machine-made | no splice. Control Code. |
| B | Same as Code A | machine-made | ultrasonic splice |
| C | Same as Code A | hand-made | no splice |
| D | Same as Code A | hand-made | ultrasonic splice |
| E | An airlaid fibrous web containing a homogenous mix of wood pulp fibers mixed in a 90:10 ratio with KoSa T255 binder fiber. The wood pulp was composed of bleached southern softwood kraft (semi-debonded Weyerhaeuser NF401). Total airlaid basis weight was 250 grams per square meter with a density of 0.14 g/cm³. The airlaid web was slit to a width of 37 mm. | hand-made | ultrasonic splice |

Density & Tensile Testing

Handmade samples had the parameters summarize in the following Table 3:

TABLE 3

| Code | Avg. Basis Wt. (g/cm³) | Density (g/cm²) | Tensile (g) | TEA (gm-cm/sq. cm) | % Stretch |
|------|-----------|---------|---------|-----------|---------|
| C | 234 | 0.11 | 1740.8 | 47.3 | 14.2 |
| D | 253.4 | 0.09 | 1315.7 | 18.7 | 7.6 |
| E | 268.6 | 0.13 | 1871.6 | 14.1 | 4.0 |

TEA = Tensile Energy Absorbed

The tensile testing was conducted with conventional tensile testing equipment and software. For example, INSTRON Tensile Testers are available from Instron Corporation, a business having offices in Canton, Ohio, U.S.A. SINTECH Tensile Testers and suitable SINTECH IMAP QAD software are available from Sintech, Inc., a business having offices in Research Triangle Park, N.C., U.S.A. The tensile testing incorporated the parameters set forth in the following Table 4:

TABLE 4

| Specimen Width | Gauge length | Crosshead speed | Jaw size | Spacing between jaws |
|--------|--------|---------|--------|----------|
| 37–50 mm | 150 mm | 25 cm/min | 50 mm | 100 mm |

Intake/Rewet Testing

Five sample pads per Code were subjected to Intake/rewet testing, using a menses simulant (swine blood). The testing provided the data summarized in the following Table 5:

TABLE 5

| | Code A | Code B | Code C | Code D | Code E |
|---|--------|--------|--------|--------|--------|
| Intake rate (sec) | | | | | |
| Average | 60.6 | 60.8 | 125.2 | 101.6 | 156.4 |
| St. dev. | 10.4 | 12.5 | 15.8 | 14.6 | 8.05 |
| Rewet (g) | | | | | |
| Average | 1.04 | 1.16 | 1.12 | 1.12 | 0.96 |
| St. dev. | 0.06 | 0.06 | 0.10 | 0.10 | 0.11 |

As representatively shown by the testing data, the spliced absorbent material had an operative tensile strength which was sufficient to support the desired sequential in-feed to the process of the invention. Additionally, the splicing region of the spliced absorbent material had a liquid permeability that was sufficient to allow a placement of the splicing region in a commercially-acceptable absorbent article. The splicing region had a configuration that did not excessively inhibit the desired distribution and/or intake of the absorbed liquid.

Thus, the present invention can provide a splice which is strong, when dry or wet, and can provide a splice which facilitates a liquid intake that is substantially equal to that of non-spliced absorbent material. Accordingly, manufactured articles which incorporate the splice need not be culled and discarded, and the manufacturing process can be operated more efficiently and economically.

It should be readily apparent that any conventional material may be employed to construct the various components incorporated into the method and apparatus of the invention. Such materials can, for example, include synthetic polymers, fiberglass-resin composites, carbon fiber-resin composites, metals, metallic composites, ceramic composites, and the like, as well as combinations thereof. The materials are typically selected to provide desired levels of strength, durability, ease of manufacture, and ease of maintenance. Similarly, in the various attachments and securements employed in the constructions of the method and apparatus of the invention, it should be readily apparent that any conventional attachment or securement technique may be employed.

Although various illustrative and representative configurations have been described in detail herein, it is to be appreciated that other variants, modifications and arrangements are possible. All of such variations, modifications and arrangements are to be considered as being within the scope of the present invention.

In view of the above, it will be seen that the several objects of the invention are achieved and other advantageous results obtained. As various changes could be made in the above without departing from the scope of the invention, it is intended that all matter contained in the above description and shown in the accompanying drawings shall be interpreted as illustrative and not in a limiting sense.

What is claimed is:

1. A substantially continuous length of absorbent material for a substantially uninterrupted sequential in-feed to a processing machine, the length of absorbent material comprising:
   a first portion of absorbent material having a trailing end, a basis weight in the range of about 60–500 g/m$^2$, a density in the range of about 0.03–0.25 g/cm$^3$ and having not more than about 15 wt % of substantially thermoplastic binder fiber;
   a second portion of absorbent material having a leading end, a basis weight in the range of about 60–500 g/m$^2$, a density in the range of about 0.03–0.25 g/cm$^3$ and having not more than about 15 wt % of thermoplastic binder fiber;
   the trailing end of the first portion of absorbent material placed in a position that overlaps in direct contact with the leading end of the second portion of absorbent material to provide an overlapped splicing region;
   the trailing end or the first portion attached to the leading end of the second portion along at least a part of said overlapped splicing region with a thermal bond that provides a splice between said first portion of absorbent material and said second portion of absorbent material;
   said splice having a tensile strength of at least about 600 grams per inch of cross-directional width of the splicing region;
   said overlapped splicing region reduced to a thickness which approaches or is less than that of a single one of the first or second portions of the absorbent material; and
   said attaching of said trailing end of the first portion to said leading end of the second portion having included an ultrasonic bonding with an ultrasonic bonding time of not more than a maximum of about 3 sec.

2. A length of absorbent material as set forth in claim 1, wherein
   lateral side edges of said trailing end of said first portion of absorbent material have been substantially aligned with lateral side edges of said leading end of said second portion of absorbent material; and
   each of said first portion of absorbent material and said second portion of absorbent material has been configured to include 90 wt % wood pulp fiber and 10 wt % of 2 denier, 6 mm bicomponent binder fiber with a polyester or polypropylene core and a polyethylene sheath.

3. A personal care absorbent article which includes an absorbent material having a splice therein, the article comprising:
   a liquid permeable bodyside liner for placement adjacent a wearer; and
   an absorbent core attached to the bodyside liner for absorbing liquid passing through the liner,
      said absorbent core including a first portion of absorbent material, and a second portion of absorbent material, each of the first and second portions of absorbent material having a basis weight in the range of about 60–500 g/m$^2$ and a density in the range of about 0.03–0.25 g/cm$^3$, each of the first portion and second portions of absorbent material including not more than about 15 wt % of thermoplastic binder fiber;
   a trailing end of the first portion of absorbent material placed in a position that overlaps in direct contact with a leading end of the second portion of absorbent material to provide an overlapped splicing region,
   the trailing end of the first portion attached to the leading end of the second portion along at least a part of said overlapped spicing region with a thermal bond that provides a splice between said first portion of absorbent material and said second portion of absorbent material,
   said splice having a tensile strength of at least about 600 grams per inch of cross-directional width of the splicing region;
   said overlapped splicing region having been reduced to a thickness which approaches or is less than that of a single one of the first or second portions of absorbent material; and
   said attaching of said trailing end of the first portion to said leading end of the second portion having included an ultrasonic bonding with an ultrasonic bonding time of not more than a maximum of about 3 sec.

4. An article as set forth in claim 3, wherein
   lateral side edges of said leading end of the second portion of absorbent material are at least generally aligned with lateral side edges of said trailing end of the first portion of absorbent material; and
   each of said first portion of absorbent material and said second portion of absorbent material includes 90 wt % wood pulp fiber and 10 wt % of 2 denier, 6 mm bicomponent binder fiber with a polyester or polypropylene core and a polyethylene sheath.

5. A personal care absorbent article as set forth in claim 3 wherein said article is a feminine hygiene product.

* * * * *